June 3, 1969   A. O. HANSON   3,447,828
TACKLE RETRIEVER
Filed April 12, 1967
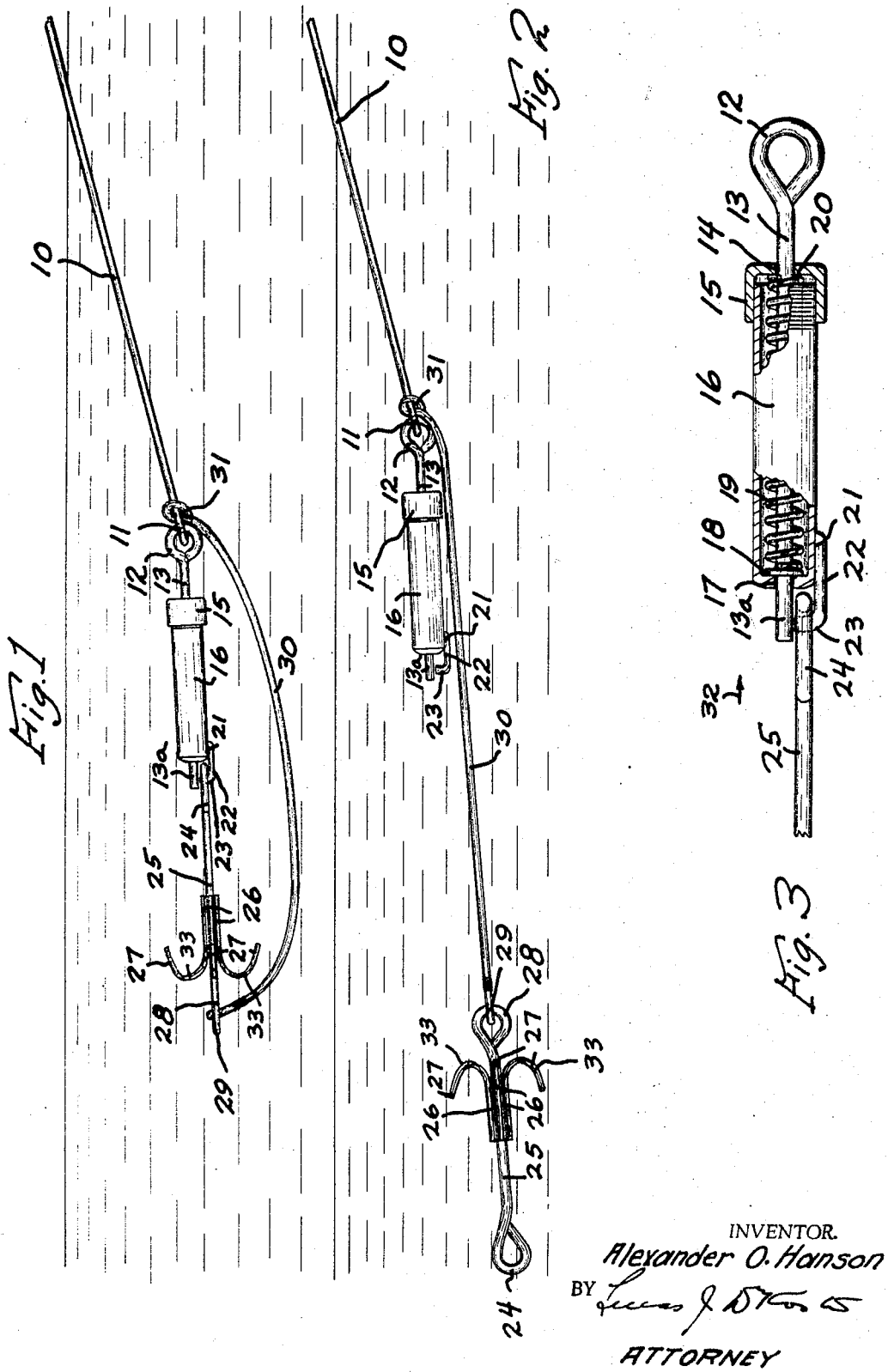
INVENTOR.
Alexander O. Hanson
BY
ATTORNEY

United States Patent Office 3,447,828
Patented June 3, 1969

3,447,828
TACKLE RETRIEVER
Alexander O. Hanson, 820 S. Spring Ave.,
Sioux Falls, S. Dak. 57104
Filed Apr. 12, 1967, Ser. No. 630,331
Int. Cl. B66f 19/00; A01k 85/02
U.S. Cl. 294—66                                2 Claims

ABSTRACT OF THE DISCLOSURE

A retriever for fishing tackle or the like. The retriever includes a grappling hook device adapted to be pulled through the water to engage the tackle. A spring loaded release allows the hooks to reverse their position to clear snags or the like.

---

My invention relates to a tackle retriever.

An object of my invention is to provide a device which will retrieve or recover fishing tackle, etc. from a lake or other body of water.

A further object of my invention is to provide a retrieving device which if snagged or caught at the retrieving end will be automatically released so that the operator thereof can recover the retrieving arrangement.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my device in its retrieving position,

FIGURE 2 is a side elevation of my device in its releasing position, and

FIGURE 3 is an enlarged partially sectional detail.

My invention contemplates the provision of a retrieving device which can be thrown to a substantial distance into the water and wherein it will grasp broken off fishing tackle, etc. which can thence be pulled in, and in the event that the device is caught against rocks, heavy branches, etc. it will automatically release itself so that it can be retrieved.

In describing my invention, I have used the character 10 to indicate a fairly heavy rope or cable which is secured as at 11 to an eye 12, which eye 12 continues into the rod 13 which passes through the opening 14 in a cap member 15 which is suitably attached to a tubular member 16 which includes a further opening 17, the other end 13a of the rod 13 passing through the opening 17.

Rigidly and securely attached to the member 13 is the expanded portion 18 which is adapted to bear against a coiled helical spring 19 which receives the rod 13, the other end 20 of the spring 19 bearing against the end of the cap 15.

Welded at 21 to the tube 16 is a keeper rod 22 terminating in the inwardly bent portion 23 which is adjacent to the said rod end 13a. Received between the member 22 and the end 13a of the rod 13 is a further eye member 24 which extends into the further rod 25 and attached at 26 to the rod 25 are the hooks 27, and attached to the other end of the rod 25 is a further eye member 28.

Attached to the member 28 at 29 is a further rope or cable 30 which is secured as at 31 to the line 10.

The device is operated in the following manner.

To retrieve hidden or lost articles and the like, the device will appear as shown in FIGURE 1 in its retrieving position, the cylinder 16 first being grasped and thrown toward the location of the lost article whereupon the device will sink toward the article, and the rope 10 is then drawn toward the boat or shore whereupon the curved hooks 27 will engage the article so that it will be drawn inwardly.

In some cases it may be necessary to cast or throw the arrangement a few times so that it will occupy the right position.

The device also has a further and very important feature which will now be explained, and provides an arrangement wherein the retrieving end of the device cannot become blocked or snagged. Under this condition, or when the hooks 27 abut against rocks or heavy branches in the water, continued pulling on the cable or rope 10 will cause the end 13a of the rod 13 to pass inwardly of the cylinder 16 and against the spring pressure of the spring 19. In this case, as the end 13a travels in the direction of the arrow 32 (See FIGURE 3) this portion 13a will pass within the cylinder as stated above, and will allow the eye 24 to pass over the end of the portion 23, whereupon the entire hooked retrieving device will swing about in the reverse direction, and to the position shown in FIGURE 2 whereupon the hooks 27 will be reversed, and whereupon the curved surfaces 33 of the said hooks will allow the hooks to pass through or past the obstruction. The retrieving device can then be pulled in.

It will now be noted that I have provided the advantages mentioned in the objects of my invention with further advantages being apparent.

Some changes may be made in the construction and arrangement of the parts of my invention without departing from the real spirit and purpose of my invention.

I claim as my invention:

1. A tackle retriever comprising hook means adapted to be pulled, keeper means adapted to hold said hook means, a spring loaded rod member adapted to hold said hook means in latched normal engagement with said keeper means, and a line attached to said rod member whereby an abnormal pull or drag on said line will cause disengagement of said rod member from said keeper means to allow reversal of the position of said hook, said hook being also attached to said line means for recovery of said hook.

2. The device of claim 1 in which said keeper means is fixed to a cylinder, said hook means including an eye adapted to be engaged with said keeper means, said rod member passing through said cylinder and having an eye externally thereof, spring means within said cylinder engaged between said cylinder and said rod member, said line being engaged with the eye on said rod member whereby an abnormal pull on said line will cause said rod member to move against the pressure of said spring to allow the hook means to disengage from the keeper and thereby to reverse its position.

References Cited

UNITED STATES PATENTS

| | | | |
|---|---|---|---|
| 2,424,040 | 7/1947 | Long | 294—66 X |
| 2,716,832 | 9/1955 | Minnie | 43—43.12 |
| 2,796,692 | 6/1957 | Harley | 43—42.04 |

EDWARD A. SROKA, Primary Examiner.

H. C. HORNSBY, Assistant Examiner.

U.S. Cl. X.R.

43—42.04